US012699614B2

(12) United States Patent (10) Patent No.: US 12,699,614 B2
Song et al. (45) Date of Patent: Aug. 4, 2026

(54) DEEP LEARNING-BASED ANALYSIS SYSTEM AND OPERATING METHOD THEREOF

(71) Applicant: Semes Co., Ltd., Cheonan-si (KR)

(72) Inventors: Byunghoo Song, Suwon-si (KR); Hyoseok Lee, Hwaseong-si (KR); Hyungsuk Lee, Yongin-si (KR)

(73) Assignee: SEMES CO., LTD., Cheonan-si (KR)

( * ) Notice: Subject to any disclaimer, the term of this patent is extended or adjusted under 35 U.S.C. 154(b) by 0 days.

(21) Appl. No.: 18/526,771

(22) Filed: Dec. 1, 2023

(65) Prior Publication Data

US 2024/0184658 A1      Jun. 6, 2024

(30) Foreign Application Priority Data

Dec. 5, 2022    (KR) ......................... 10-2022-0168084

(51) Int. Cl.
*G06F 11/00* (2006.01)
*G06F 11/07* (2006.01)
*G06N 20/00* (2019.01)

(52) U.S. Cl.
CPC ...... *G06F 11/0769* (2013.01); *G06F 11/0721* (2013.01); *G06N 20/00* (2019.01)

(58) Field of Classification Search
CPC ............. G06F 11/0769; G06F 11/0721; G06F 11/0751; G06F 11/0772; G06N 20/00
See application file for complete search history.

(56) References Cited

U.S. PATENT DOCUMENTS 11,334,407 B2 * 5/2022 Okanohara .............. G06N 7/00
11,625,032 B2 * 4/2023 Basak ................ G05B 23/0283
                                                          702/183

(Continued)

FOREIGN PATENT DOCUMENTS

CN          114638633 A      6/2022
JP       2020-201890 A     12/2020

(Continued)

OTHER PUBLICATIONS

Choi, Yeji, et al., "Gan-based anomaly detection and localization of multivariate time series data for power plant," 2020 IEEE international conference on big data and smart computing (BigComp), IEEE, 2020.

(Continued)

*Primary Examiner* — Jonathan D Gibson
(74) *Attorney, Agent, or Firm* — Muir Patent Law, PLLC

(57) ABSTRACT

A deep learning-based analysis system includes a detection device configured to create multivariate time-series data through a plurality of sensors of an equipment process, and an analysis device including at least one processor, wherein, when receiving the multivariate time-series data created through the plurality of sensors from the detection device, the processor of the analysis device is configured to obtain a correlation degree between a plurality of sensors based on a first learning model using the received multivariate time-series data as input, and calculate an error score for each sensor based on a second learning model using time-series data for each sensor extracted from the received multivariate time-series data as input.

18 Claims, 10 Drawing Sheets

(56) References Cited

U.S. PATENT DOCUMENTS

| | | | | |
|---|---|---|---|---|
| 11,640,328 | B2 * | 5/2023 | Burch | G06F 11/0706 |
| | | | | 714/37 |
| 11,656,927 | B1 * | 5/2023 | Rosenkranz | G06F 11/0751 |
| | | | | 714/26 |
| 11,670,154 | B2 * | 6/2023 | Lin | G08B 21/187 |
| | | | | 340/679 |
| 2016/0103724 | A1 * | 4/2016 | Kim | G06F 11/0751 |
| | | | | 714/37 |
| 2018/0150344 | A1 * | 5/2018 | Kim | G06F 11/079 |
| 2019/0204818 | A1 * | 7/2019 | Ogata | G05B 23/0283 |
| 2020/0379454 | A1 * | 12/2020 | Trinh | G06N 20/00 |
| 2020/0388545 | A1 * | 12/2020 | Honda | H10P 74/20 |
| 2021/0110262 | A1 * | 4/2021 | Schmitt | G06N 3/0985 |
| 2021/0209486 | A1 * | 7/2021 | Fan | G06N 20/20 |
| 2022/0092474 | A1 * | 3/2022 | Chattopadhyay | G06N 20/00 |
| 2023/0039073 | A1 * | 2/2023 | Fallah | G05B 23/0283 |
| 2023/0081892 | A1 * | 3/2023 | Nozuki | G05B 23/0221 |
| | | | | 702/183 |
| 2023/0267028 | A1 * | 8/2023 | Zope | G06F 11/0736 |
| | | | | 714/26 |
| 2023/0350745 | A1 * | 11/2023 | Tsuduki | G06F 11/079 |
| 2024/0037419 | A1 * | 2/2024 | Mukhopadhyay | G06N 5/022 |
| 2024/0103950 | A1 * | 3/2024 | Ha | G06F 11/0721 |
| 2024/0143425 | A1 * | 5/2024 | Porter | G05B 23/024 |
| 2024/0152123 | A1 * | 5/2024 | Zope | G05B 19/4183 |
| 2025/0245816 | A1 * | 7/2025 | Kim | G06V 10/762 |
| 2025/0298688 | A1 * | 9/2025 | Zhang | G06N 5/045 |

FOREIGN PATENT DOCUMENTS

| | | |
|---|---|---|
| KR | 10-2021-0115991 A | 9/2021 |
| KR | 10-2373933 | 3/2022 |
| WO | 2021-151521 A1 | 8/2021 |

OTHER PUBLICATIONS

Office Action dated Dec. 11, 2024 for corresponding KR Patent Application No. 10-2022-0168084.

* cited by examiner

DEEP LEARNING-BASED ANALYSIS SYSTEM AND OPERATING METHOD THEREOF

CROSS-REFERENCE TO RELATED APPLICATION

This application is based on and claims priority under 35 U.S.C. § 119 to Korean Patent Application No. 10-2022-0168084, filed on Dec. 5, 2022, in the Korean Intellectual Property Office, the disclosure of which is incorporated by reference herein in its entirety.

BACKGROUND

1. Field

The disclosure relates to a deep learning-based analysis system and an operating method thereof, and more particularly, to a system for analyzing data to diagnose an error based on deep learning and an operating method of the system.

2. Description of the Related Art

According to the related art, in diagnosing errors that occur in an equipment process, data created inside equipment is collected and deterioration and/or failure of a driver are monitored using the collected data.

In particular, according to the related art, multivariate time-series data created in the equipment is transformed and analyzed in a graph form. In this case, when meaningful values or analysis data are not obtained from specific data in a graph form, other certain data is analyzed.

SUMMARY

Monitoring the entire multivariate time-series data created in an equipment process is time-consuming and expensive. In a certain equipment process (e.g., display equipment), a length of time-series data varies depending on temporal characteristics for each data, and thus it is difficult to perform analysis for each data.

Provided is a deep learning-based analysis system and an operating method thereof, which shorten an analysis time for data created in the equipment process and improve the accuracy of error diagnosis.

The objects to be achieved according to the technical spirit of the disclosure are not limited to the technical objects described above and other objects that are not stated herein will be clearly understood by those skilled in the art from the following specifications.

Additional aspects will be set forth in part in the description which follows and, in part, will be apparent from the description, or may be learned by practice of the presented embodiments of the disclosure.

According to an aspect of the disclosure, a deep learning-based analysis system includes a detection device configured to create multivariate time-series data through a plurality of sensors of an equipment process, and an analysis device including at least one processor, wherein, when receiving the multivariate time-series data created through the plurality of sensors from the detection device, the processor of the analysis device is configured to obtain a correlation degree between a plurality of sensors based on a first learning model using the received multivariate time-series data as input, and calculate an error score for each sensor based on a second learning model using time-series data for each sensor extracted from the received multivariate time-series data as input.

According to an embodiment, the processor may be further configured to generate the first learning model that learns the correlation degree between the plurality of sensors based on the multivariate time-series data created through the plurality of sensors.

According to an embodiment, the processor may be configured to generate the first learning model that learns the correlation degree between the plurality of sensors based on similarity-related feature characteristics for the multivariate time-series data created through the plurality of sensors.

According to an embodiment, the processor may be further configured to convert the multivariate time-series data created through the plurality of sensors into image data and generate a second learning model that learns an abnormal tendency based on the converted image data for each sensor and the correlation degree between the plurality of sensors.

According to an embodiment, the converted image data for each sensor may have a preset data size.

According to an embodiment, the processor may be further configured to compare a plurality of image data having the correlation degree between the plurality of sensors greater than or equal to a preset value among the converted image data for each sensor to obtain and learn the abnormal tendency.

According to an embodiment, the processor may be further configured to calculate reconstruction loss for the converted image data for each sensor of the plurality of sensors based on the second learning model and calculate reconstruction loss for the converted image data for each sensor of the plurality of sensors based on the second learning model.

According to an embodiment, the analysis device may further include an interface configured to output data, and the processor may be configured to detect a sensor having the calculated error score for each sensor greater than or equal to a threshold value among the plurality of sensors, and output data for a process operation corresponding to the detected sensor through the interface.

According to another aspect of the disclosure, an operating method of a deep learning-based analysis system includes receiving multivariate time-series data created through a plurality of sensors of an equipment process from a detection device through an analysis device, obtaining a correlation degree between the plurality of sensors based on a first learning model using the received multivariate time-series data as input, and calculating an error score for each sensor based on a second learning model using time-series data for each sensor extracted from the received multivariate time-series data as input.

According to an embodiment, the method may further include generating the first learning model that learns the correlation degree between the plurality of sensors based on the multivariate time-series data created through the plurality of sensors.

According to an embodiment, the method may further include generating the first learning model that learns the correlation degree between the plurality of sensors based on similarity-related feature characteristics for the multivariate time-series data created through the plurality of sensors.

According to an embodiment, the method may further include converting the time-series data for each sensor created through the plurality of sensors into image data for each sensor, and generating the second learning model that learns an abnormal tendency based on the converted image data for each sensor and the correlation degree between the plurality of sensors.

According to an embodiment, the converted image data for each sensor may have a preset data size.

According to an embodiment, the method may further include comparing a plurality of image data having the correlation degree between the plurality of sensors greater than or equal to a preset value among the converted image data for each sensor to obtain and learn the abnormal tendency.

According to an embodiment, the method may further include calculating reconstruction loss for the converted image data for each sensor of the plurality of sensors based on the second learning model, and calculating the error score for each sensor based on the calculated reconstruction loss.

According to an embodiment, the method may further include detecting a sensor having the calculated error score for each sensor greater than or equal to a threshold value among the plurality of sensors, and outputting data for a process operation corresponding to the detected sensor through an interface.

According to another aspect of the disclosure, a deep learning-based analysis device includes a communication unit configured to receive data through communication establishment with an outside, and at least one processor, wherein the processor is configured to receive multivariate time-series data created through a plurality of sensors of an equipment process through the communication unit, extract a correlation degree between a plurality of sensors based on a first learning model using the received multivariate time-series data as input, and calculate an error score for each sensor based on a second learning model using the correlation degree between plurality of sensors as input.

According to an embodiment, the processor may be further configured to generate the first learning model that learns the correlation degree between the plurality of sensors based on the multivariate time-series data created through the plurality of sensors.

According to an embodiment, the processor may be configured to convert multivariate time-series data created through the plurality of sensors into image data for each sensor and generate the second learning model that learns an abnormal tendency based on the converted image data for each sensor and the correlation degree between the plurality of sensors.

According to an embodiment, the processor may be configured to calculate reconstruction loss for the converted image data for each sensor of the plurality of sensors based on the second learning model and calculate the error score for each sensor based on the calculated reconstruction loss.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
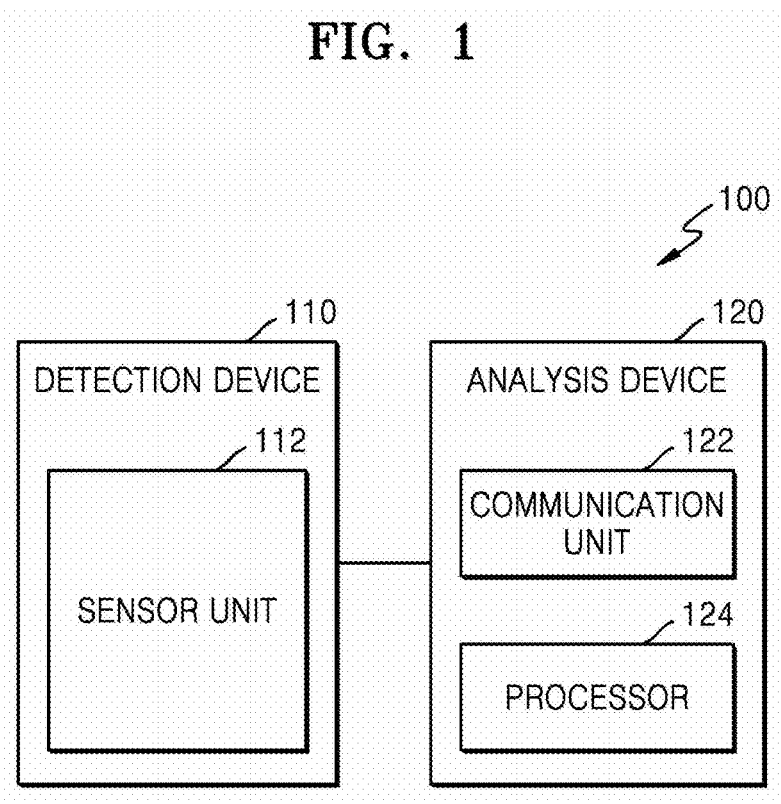
FIG. 1 is a block diagram of a deep learning-based analysis system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, an embodiment will be described in detail with reference to the attached drawings Embodiments are provided to more completely explain the disclosure to those skilled in the art, and the following embodiments may be modified into various other forms, and the scope of the disclosure is not limited to the following embodiments. Rather, these embodiments are provided so that the disclosure will be thorough and complete, and will fully convey the scope of the disclosure to those of ordinary skill in the art.

It will be understood that when a component is referred to as being connected to another component, it may be directly connected to the other component or a third component may intervene therebetween. Similarly, it will be understood that when a component is referred to as being on or above another component, the component may be directly on another component or a third component may intervene therebetween. In the drawings, the structure or size of each component is exaggerated for convenience and clarity of illustration and portions unrelated to description are omitted. In the drawings, the same elements are denoted by the same reference numerals, and a repeated explanation thereof will not be given. Terms used therein are used only for illustrative purposes and are not intended to limit the scope of the inventive concept defined in the claims.

FIG. 1 is a block diagram of a deep learning-based analysis system 100 according to an embodiment.

Referring to FIG. 1, the deep learning-based analysis system 100 may include a detection device 110 and an analysis device 120.

In an embodiment, the detection device 110 may collect data about an equipment process that is a target of diagnosis through a sensor unit 112. At this time, the equipment process may include semiconductor equipment used in a semiconductor process or display equipment used in a display process. However, the equipment process is not limited thereto and may include equipment processes of various types and models.

In an embodiment, the sensor unit 112 may include a plurality of sensors to create data related to driving of the equipment process. For example, the sensor unit 112 may create torque, speed, and acceleration data of a motor, internal and external vibration data, temperature data, time data, barometric pressure data, pressure data, slope data, current data, and the like, included in the equipment process, through the plurality of sensors.

In an embodiment, the sensor unit 112 may create multivariate time-series data. The multivariate time-series data may refer to data that is collected at regular intervals over time and has multiple values for each time unit. For example, the sensor unit 112 may collect speed data, temperature data, vibration data, and pressure data of the motor at regular intervals through the plurality of sensors and create multivariate time-series data.

In an embodiment, the analysis device 120 may include a communication unit 122 and a processor 124. Components of the analysis device 120 according to an embodiment are not limited thereto, and other components may be added or at least one component may be omitted in some embodiments.

In an embodiment, the communication unit 122 may include at least one component for receiving data by establishing communication with the outside. For example, the analysis device 120 may receive the multivariate time-series data created by the detection device 110, through the communication unit 122.

In an embodiment, the communication unit 122 may include a short-range wireless communication unit and a wireless communication unit.

The short-range wireless communication unit may include a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultrawideband (UWB) communication unit, and an Ant+ communication unit, but is not limited thereto.

The wireless communication unit may include a cellular network communication unit, an Internet communication unit, and a computer network (e.g., LAN or WAN) communication unit, but is not limited thereto.

In an embodiment, the processor 124 may diagnose errors in the equipment process through a series of data analysis processes based on deep learning on the multivariate time-series data received through the communication unit 122. At this time, the processor 124 may obtain a correlation degree between a plurality of sensors through a first learning model from the multivariate time-series data received from the detection device 110, and may then calculate an error score for each sensor through a second learning model.

In more detail, the processor 124 may perform a diagnostic operation based on whether there are a first learning model and a second learning model.

For example, when receiving the multivariate time-series data through the communication unit 122, the processor 124 may determine whether there is the first learning model. In this case, when there is the first learning model, a subsequent diagnostic operation may be performed, but when there is no first learning model, the first learning model may be generated through deep learning on the multivariate time-series data.

After the first learning model is generated, the processor 124 may determine whether there is the second learning model. In this case, when there is the second learning model, a subsequent diagnostic operation may be performed, but when there is no second learning model, the second learning model may be generated through deep learning on time-series data for each sensor converted to image data.

In an embodiment, the processor 124 may extract a sensor, an error score of which is greater than or equal to a threshold value during the equipment process, and determine that an error occurs in a process operation corresponding to the extracted sensor. For example, when the deep learning-based analysis system 100 detects and analyzes display equipment used in a display process, if an error score for data obtained from an acceleration sensor among multivariate time-series data corresponding to a certain display substrate is greater than or equal to a threshold value, the processor 124 may determine that an error occurs in an acceleration process in the display equipment, analyze the cause, and detect the display substrate to be abnormal (or defective).

In an embodiment, the analysis device 120 may further include an interface (not shown) outputting analysis data. For example, the processor 124 may output data about a process operation in which an error occurs (e.g., data about a process operation corresponding to a detected sensor with a calculated error score for each sensor that is greater than or equal to a threshold value among a plurality of sensors) through an interface (not shown) and provide notification to a user. The interface (not shown) may be a display that visually outputs the data about the process operation in which an error occurs, a haptic module that converts the data into mechanical or electrical stimulation and outputs the data tactilely, or an acoustic module that outputs the data audibly. However, the type and output data of interface are not limited thereto.

Figure 2:
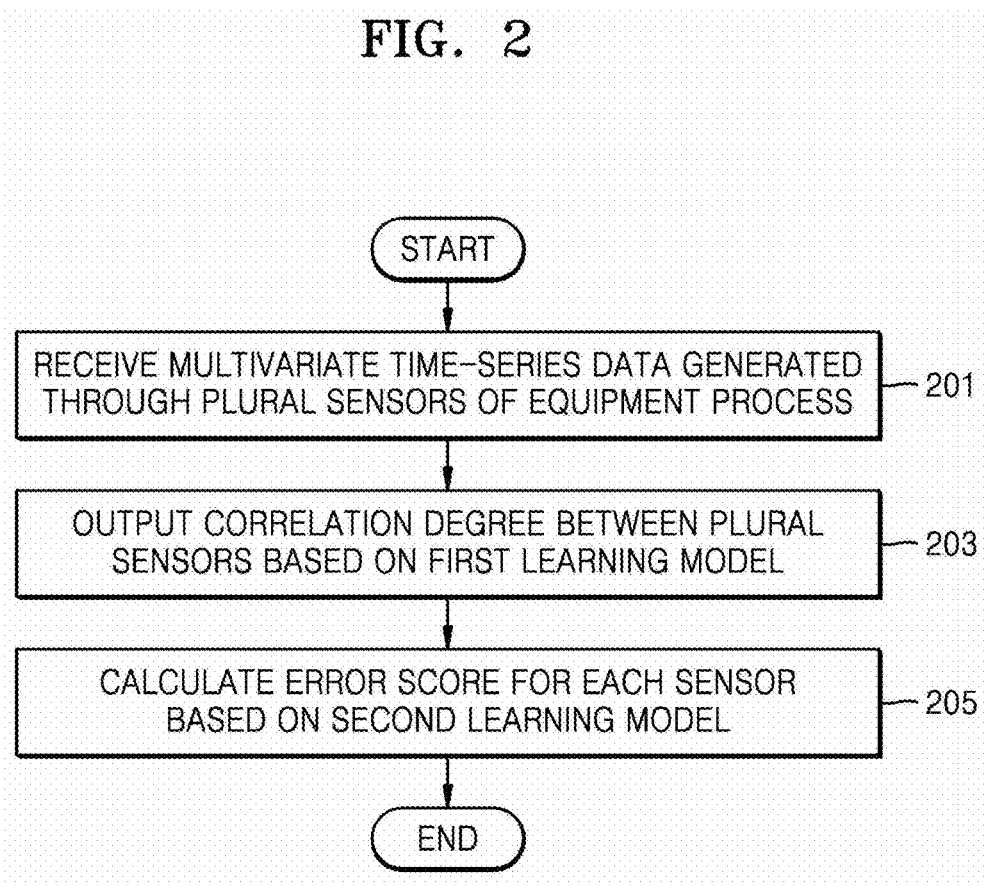
FIG. 2 is a flowchart showing a case in which a deep learning-based analysis system processes multivariate time-series data, according to an embodiment.
Figure 3:
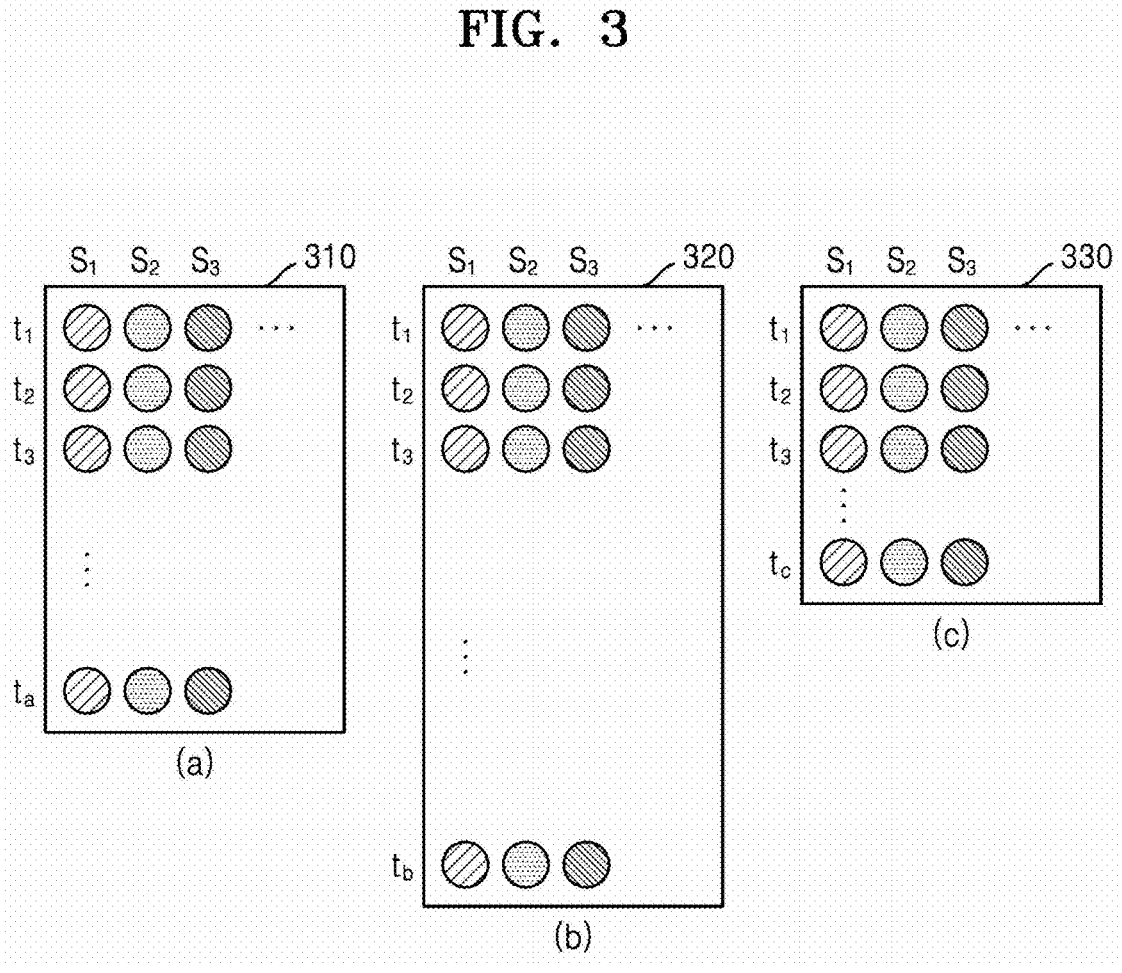
FIG. 3 is an example diagram of multivariate time-series data, according to an embodiment.

FIG. 2 is a flowchart showing a case in which a deep learning-based analysis system processes multivariate time-series data, according to an embodiment. FIG. 3 is an example diagram of multivariate time-series data, according to an embodiment. A processing method of FIG. 2 may be performed by the analysis device 120 of the deep learning-based analysis system 100 of FIG. 1, and thus content that corresponds to, is the same as, or is similar to the content described above may be omitted.

Referring to FIG. 2, an analysis device (e.g., the analysis device 120 of FIG. 1) of a deep learning-based analysis system (e.g., the deep learning-based analysis system 100 of FIG. 1) may receive the multivariate time-series data created from a detection device (e.g., the detection device 110 of FIG. 1) in operation 201. At this time, the multivariate time-series data may refer to time-series data created through a plurality of sensors in various equipment processes.

In an embodiment, the multivariate time-series data received from the detection device 110 may have different data sizes according to different temporal characteristics. When the deep learning-based analysis system 100 analyzes and diagnoses display equipment used in a display process, the process may be substantially increased depending on an external condition (e.g., presence or absence of ink in a nozzle) due to the characteristics of the equipment, and thus a time taken to generate one substrate may vary.

For example, when the analysis device 120 receives data about a substrate (a) to a substrate (c) of FIG. 3 from the detection device 110, the analysis device 120 may receive the data in the form of first data 310 about the substrate (a), second data 320 about the substrate (b), and third data 330 about the substrate (c). At this time, items related to a plurality of sensors (e.g., a first sensor $s_1$, a second sensor $s_2$, and a third sensor $s_3$) of the equipment process may be listed on a column axis of the first data 310 to the third data 330, and a time (e.g., $t_1$, $t_2$, $t_3$, . . . and, $t_n$) at which data is collected may be listed on a row axis. At this time, a time interval for collecting data may be set by considering an operation time, an operation cycle, and the like of the equipment process.

The analysis device 120 may obtain information indicating that the data collection time is $t_1$ to $t_a$, from the row axis of the first data 310. That is, the analysis device 120 may obtain information indicating that the detection device 110 collects data for a time $t_a$ for the substrate (a), and thus it may be derived that a time taken to generate the substrate (a) is $t_a$, from the obtained information.

The analysis device 120 may obtain information indicating that a data collection time is $t_1$ to $t_b$, from a row axis of the second data 320. That is, the analysis device 120 may obtain information indicating that the detection device 110 collects data for a time to for the substrate (b), and thus it may be derived that a time taken to generate the substrate (b) is to and a time to taken to generate the substrate (b) is longer than that of the substrate (a), from the obtained information.

The analysis device 120 may obtain information indicating that a data collection time is $t_1$ to $t_c$, from a row axis of third data 330. That is, the analysis device 120 may obtain information indicating that the detection device 110 collects data for a time to for the substrate (c), and thus it may be derived that a time taken to generate the substrate (c) is $t_c$, and a time to taken to generate the substrate (c) is shorter than that of the substrate (a), from the obtained information.

In other words, the respective times taken to generate the substrate (a) to the substrate (c) are different, and thus the multivariate time-series data received from the detection device 110 may have different data sizes.

According to an embodiment, the analysis device 120 may obtain a correlation degree between a plurality of sensors based on the first learning model in operation 203. At this time, the first learning model may use the multivariate time-series data received from the detection device 110 as input. For example, the analysis device 120 may encode the multivariate time-series data received from the detection device 110 and may then extract time-series data for each sensor to compare correlations, and thus may obtain a correlation degree between a plurality of sensors.

In an embodiment, the first learning model may obtain a correlation degree between a plurality of sensors based on similarity-related feature characteristics. For example, the analysis device 120 may encode the multivariate time-series data received from the detection device 110 and may then extract first time-series data related to a first sensor and second time-series data related to a second sensor.

At this time, when the first time-series data and the second time-series data have feature characteristics of high similarity, the first learning model may learn a high correlation degree between the first sensor and the second sensor. When the first time-series data and the second time-series data have feature characteristics of low similarity, the first learning model may learn a low correlation degree between the first sensor and the second sensor.

The range of a correlation degree between a plurality of sensors may be −1 to 1. It may be derived that, as the correlation degree approaches 1, there is a strong positive correlation between sensors, and as the correlation degree approaches −1, there is a strong negative correlation between sensors.

In another embodiment, the first learning model may also obtain a correlation degree between a plurality of sensors based on a method such as a Pearson correlation coefficient or a Kendall's Tau rank correlation coefficient.

According to an embodiment, the analysis device 120 may calculate an error score for each sensor based on the second learning model in operation 205. In this case, the second learning model may use the time-series data for each sensor extracted from the multivariate time-series data as input. For example, the analysis device 120 may convert time-series data for each sensor into image data for each sensor and input the image data for each sensor to the second learning model. However, an algorithm for converting time-series data into image data will be described below in detail with reference to FIG. 8.

In an embodiment, the analysis device 120 may calculate an error score for each sensor based on reconstruction loss in the second learning model. For example, the second learning model may be configured with an encoder and a decoder, and when receiving converted image data related to a certain sensor for the second learning model, the analysis device 120 may obtain a reconstruction loss value that represents a difference between image data input to the encoder and image data output from the decoder. The analysis device 120 may determine the obtained reconstruction loss value as an error score for each sensor.

Figure 4:
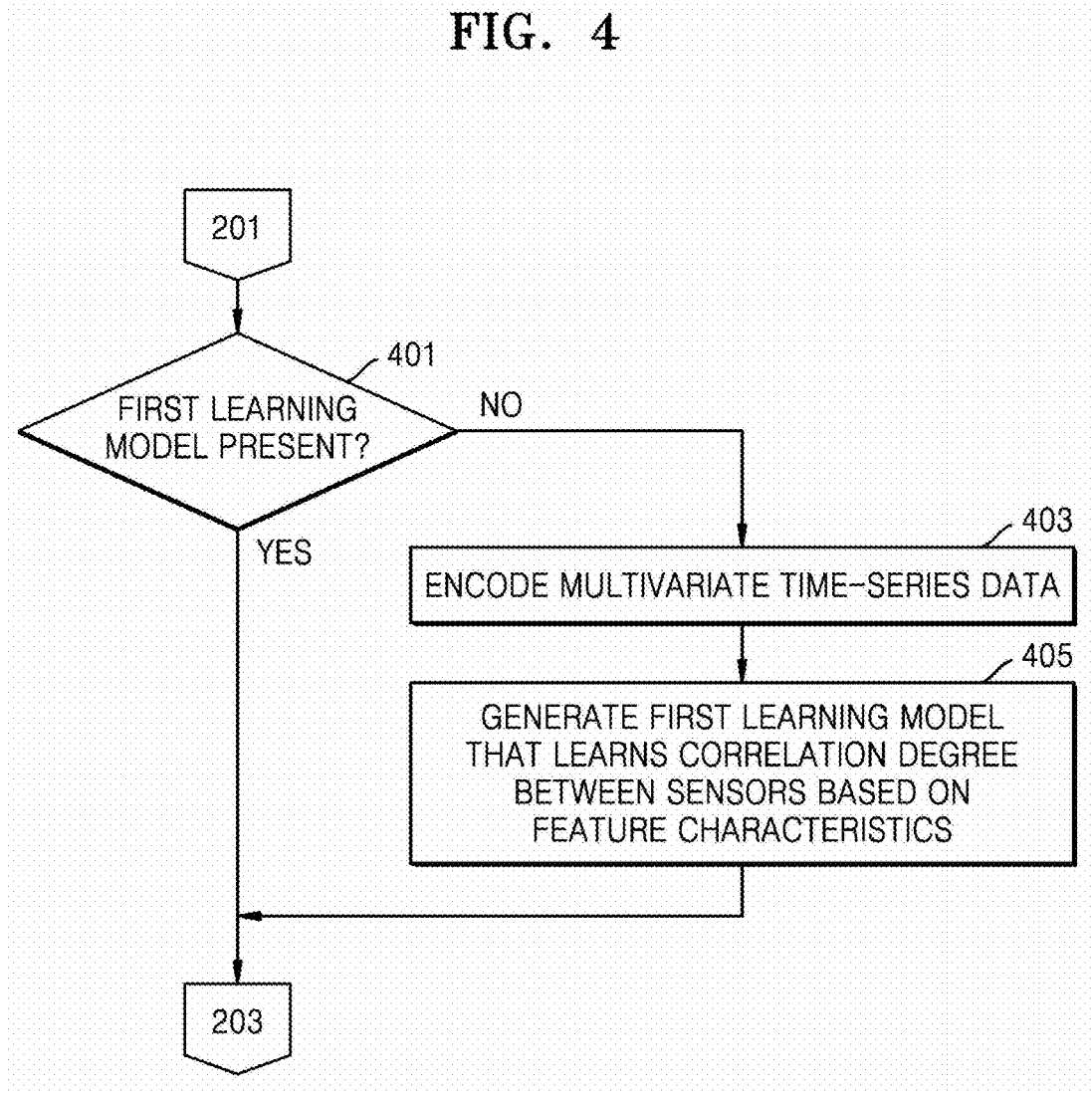
FIG. 4 is a flowchart showing a case in which a deep learning-based analysis system generates a first learning model, according to an embodiment.

FIG. 4 is a flowchart showing a case in which a deep learning-based analysis system generates a first learning model, according to an embodiment. FIG. 4 additionally shows operations subsequent to operation 201 of FIG. 2, and thus content that corresponds to, is the same as, or is similar to the content described above may be omitted.

Referring to FIG. 4, a processor (e.g., the processor 124 of FIG. 1) of an analysis device (e.g., the analysis device 120 of FIG. 1) of a deep learning-based analysis system (e.g., the deep learning-based analysis system 100 of FIG. 1) may determine whether there is a first learning model in operation 401. In this case, the "first learning model" refers to a learning model that learns a correlation degree between a plurality of sensors based on the multivariate time-series data received from a detection device (e.g., the detection device 110 of FIG. 1).

According to an embodiment, when there is a previously generated first learning model, the processor 124 may proceed to operation 203.

According to an embodiment, when there is no previously generated first learning model, the processor 124 may encode the multivariate time-series data in operation 403. At this time, the processor 124 may obtain and encode data over time, and thus the multivariate time-series data may be encoded in a series of operations in which the multivariate time-series data is obtained.

Then, the processor 124 may extract data from the encoded multivariate time-series data to distinguish the data for each sensor but include a time-series component. As described above, the extracted data may be in the form of a graph of a time and a sensing range.

According to an embodiment, the processor 124 may generate the first learning model that learns a correlation degree between sensors based on the similarity-related feature characteristics in operation 405. For example, the processor 124 may encode the multivariate time-series data received from the detection device 110 and may then extract first time-series data related to the first sensor (e.g., temperature sensor) and second time-series data related to the second sensor (e.g., acceleration sensor).

In an embodiment, the processor 124 may display each time-series data in vector form (i.e., in the form of an original vector) by performing preprocessing by encoding multivariate time-series data. Then, the processor 124 may input each time series data displayed in vector form to an auto-encoder to generate a first learning model that learns a correlation degree between sensors. This will be described below in detail with reference to FIG. 5.

When the extracted data has the form of a graph of a time and a sensing range as described above, the processor 124 may input the graph of the first time-series data and the second time-series data to the first learning model and determine and output a correlation degree between the first sensor and the second sensor depending on whether there are the same and/or similar feature characteristics. This will be described below in detail with reference to FIG. 6.

For example, in relation to a correlation degree, when a preset value is 0.7 and the processor 124 obtains that a correlation degree of the first time-series data and the second time-series data is 0.89 through the first learning model, the processor 124 may output that a correlation degree between a temperature sensor as the first sensor and an acceleration sensor as the second sensor is 0.89 and corresponds to a high correlation, through the first learning model. For another example, in relation to a correlation degree, when the preset value is 0.7 and the processor 124 obtains that the correlation degree of the first time-series data and the second time-series data is 0.25 through the first learning model, the processor 124 may output that the correlation degree between the temperature sensor as the first sensor and the acceleration sensor as the second sensor is 0.25 and there is no correlation degree, through first learning model.

Figure 5:
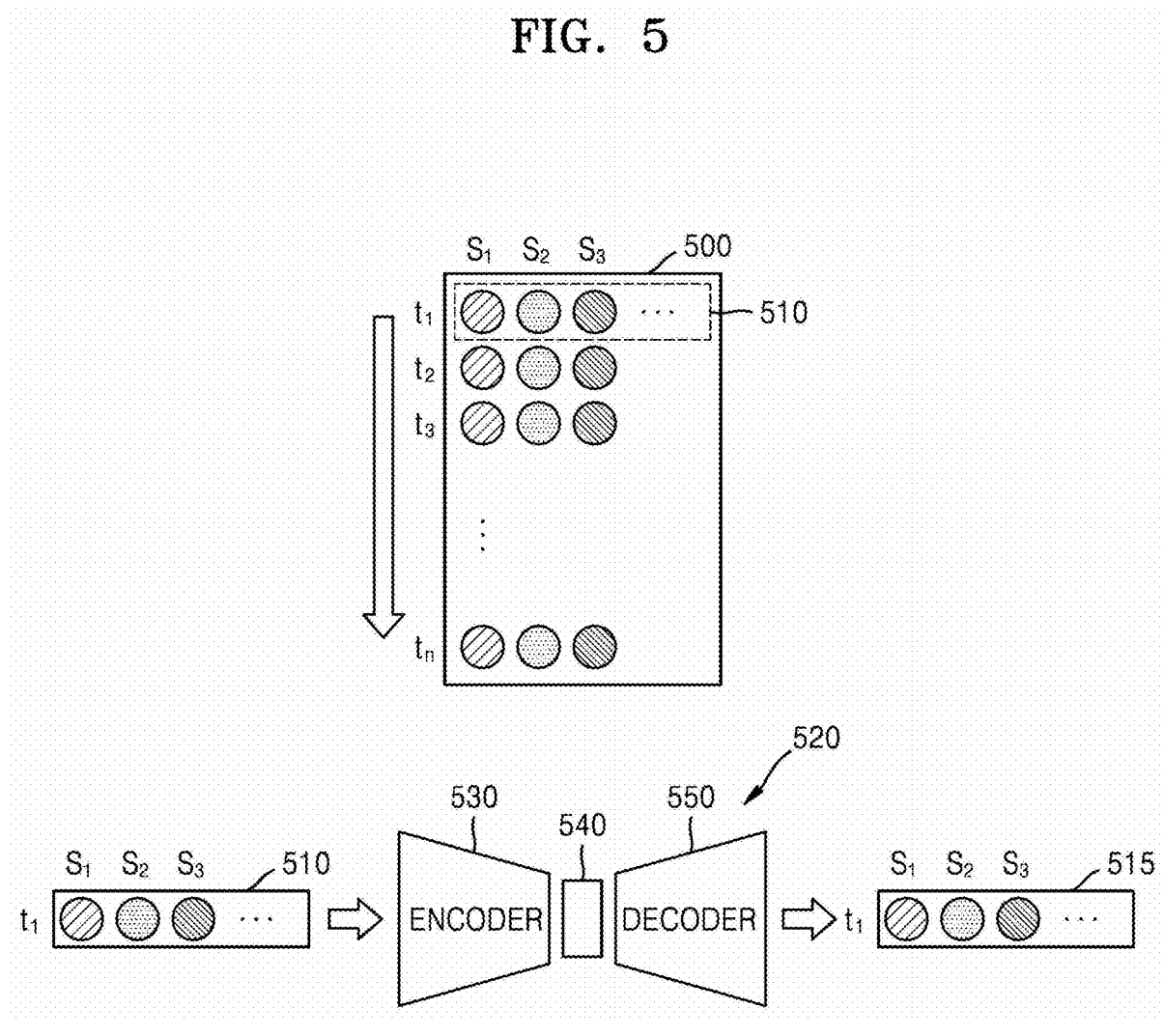
FIG. 5 is an example diagram for explaining a method of generating the first learning model of FIG. 4.

FIG. 5 is an example diagram for explaining a method of generating the first learning model of FIG. 4.

Referring to FIG. 5, multivariate time-series data 500 for a certain substrate may be obtained over time. For example, the multivariate time-series data 500 may sequentially obtain data collected at a first time point $t_1$, data collected at a second time point $t_2$, data collected at a third time point $t_3$, . . . , and data collected at an $n^{th}$ time point $t_n$ for a plurality of sensors. Thus, an analysis device (e.g., the analysis device 120 of FIG. 1) may perform preprocessing by encoding the multivariate time-series data 500 in a series of operations in which the multivariate time-series data 500 is obtained.

In an embodiment, the analysis device 120 may display each data in vector form (i.e., the form of an original vector) by performing preprocessing by encoding the multivariate time-series data 500. Then, the analysis device 120 may input each data displayed in vector form to an auto-encoder 520. In this case, the auto-encoder 520 may refer to the "first learning model".

When a certain original vector is input to the auto-encoder 520, an encoder 530 may perform lossy compression on data of the original vector, and a decoder 550 may perform decompression on lossy compressed intermediate data. The auto-encoder 520 may automatically learn a method of extracting a feature vector from the original vector such that a restoration vector obtained by performing decompression through the decoder 550 becomes the same as the original vector.

For example, when a first original vector obtained by preprocessing data 510 collected at the first time point $t_1$ is input to the auto-encoder 520, the encoder 530 may perform lossy compression on data of the first original vector, and the decoder 550 may perform decompression on lossy compressed intermediate data. In this case, the auto-encoder 520 may extract the feature vector from the first original vector such that the data 510 collected at the first time point $t_1$ is the same as data 515 output from the auto-encoder 520.

Then, as the original vector obtained from the data collected at the second time point $t_2$, the third time point $t_3$, . . . , and the $n^{th}$ time point $t_n$ is input to the auto-encoder 520, the auto-encoder 520 may automatically learn a method of extracting an optimal feature vector.

In an embodiment, a latent space 540 may include a feature vector extracted from the original vector through the auto-encoder 520. For example, when a feature vector extracted from a vector form of the multivariate time-series data 500 is included in the latent space 540, the latent space 540 may include the feature vectors separately according to a correlation degree for each sensor of data. This will be described below in detail with reference to FIG. 7.

Figure 6:
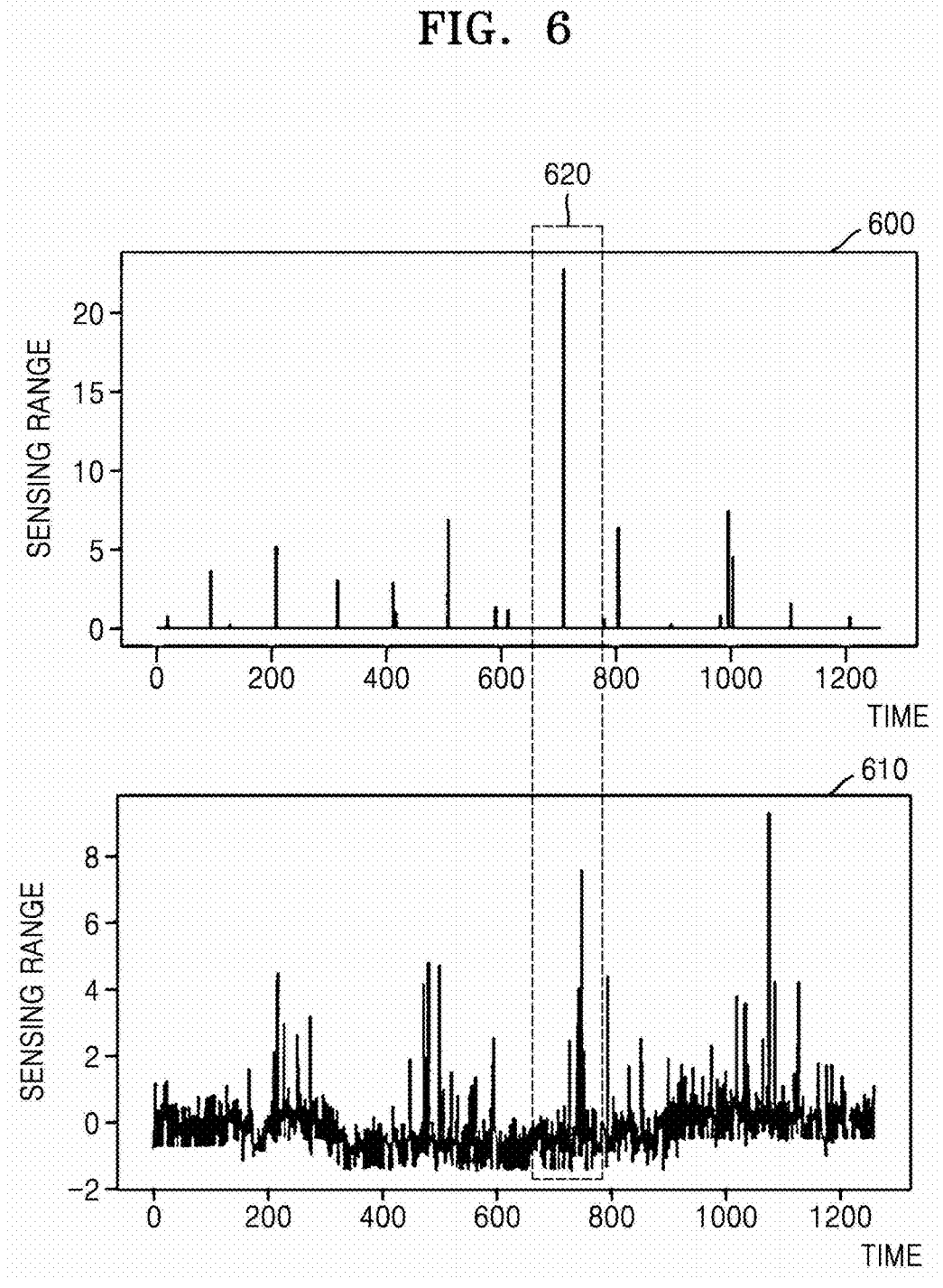
FIG. 6 is an example diagram for explaining similarity-related feature characteristics of sensor data, according to an embodiment.

FIG. 6 is an example diagram for explaining similarity-related feature characteristics of sensor data, according to an embodiment.

Referring to FIG. 6, an analysis device (e.g., the analysis device 120 of FIG. 1) may extract time-series data for each sensor from multivariate time-series data received from a detection device (e.g., the detection device 110 of FIG. 1). For example, when receiving multivariate time-series data (e.g., the multivariate time-series data 500 of FIG. 5) from the detection device 110, a processor (e.g., the processor 124 of FIG. 1) of the analysis device 120 may extract time-series data for each sensor for a plurality of sensors including the first sensor $1, the second sensor $s_2$, and the third sensor $s_3$.

In this case, time-series data for the first sensor $s_1$ may refer to column 1 data of the multivariate time-series data 500, time-series data for the second sensor $s_2$ may refer to column 2 data of the multivariate time-series data 500, and time-series data for the third sensor $s_3$ may refer to column 3 data of the multivariate time-series data 500.

For example, a first graph 600 may be time-series data for the first sensor $s_1$, and a second graph 610 may be time-series data for the second sensor $s_2$. The first graph 600 may include a pattern in which sensing data of the first sensor $s_1$ rises rapidly in about 70 seconds (700 ms). The second graph 610 may include a pattern in which sensing data of the second sensor $s_2$ rise rapidly in about 75 seconds (750 ms).

In an embodiment, depending on a correlation degree between the first sensor $s_1$ and the second sensor $s_2$, whether a sudden rising pattern 620 commonly found in the first graph 600 and the second graph 610 is due to an abnormal tendency may vary. For example, when the correlation degree (e.g., 0.89) between the first sensor $s_1$ and the second sensor $s_2$ is higher than a preset value (e.g., 0.7), the sudden rising pattern 620 in the first graph 600 and the second graph 610 may be a pattern obtained during a normal operation that is not due to an abnormal tendency in a process operation. For another example, when the correlation degree (e.g., 0.25) obtained between the first sensor $s_1$ and the second sensor $s_2$ is lower than a preset value (e.g., 0.7), the sudden rising pattern 620 may be a pattern due to an abnormal tendency in a process operation.

Figure 7:
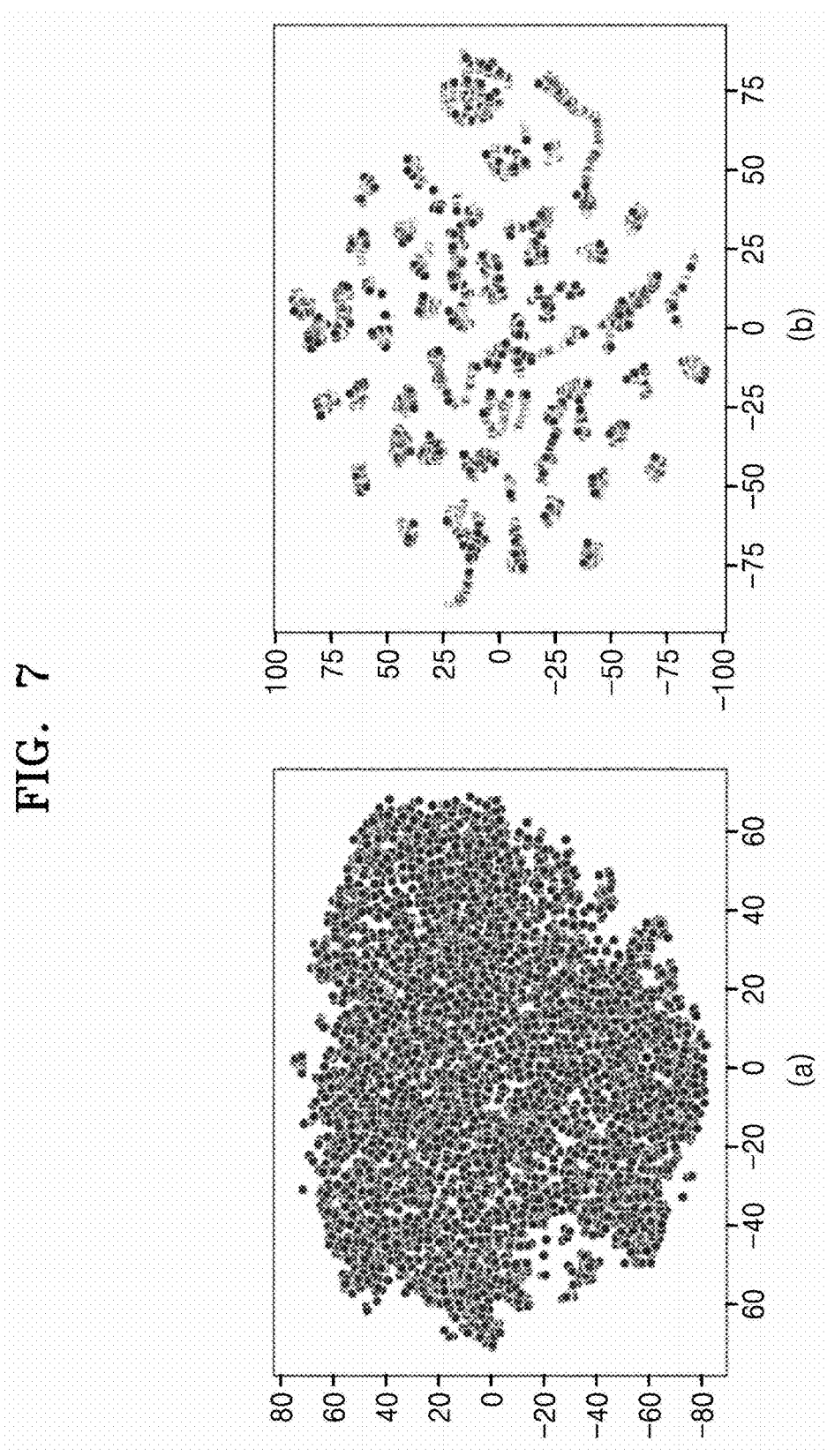
FIG. 7 is an example diagram for explaining sensor data before and after learning through the first learning model of FIG. 4.

FIG. 7 is an example diagram for explaining sensor data before and after learning through the first learning model of FIG. 4.

Referring to FIG. 7, an analysis device (e.g., the analysis device 120 of FIG. 1) may obtain a correlation degree between a plurality of sensors through a first learning model (e.g., the auto-encoder 520 of FIG. 5). For example, as multivariate time-series data (e.g., the multivariate time-series data 500 of FIG. 5) is received from a detection device (e.g., the detection device 110 of FIG. 1), a processor (e.g., the processor 124 of FIG. 1) of the analysis device 120 may extract a feature vector by performing processing and learning on the multivariate time-series data 500. In this case, the feature vector may be extracted based on time-series data for each sensor of the multivariate time-series data 500. For example, the feature vector may be extracted from time-series data for each sensor based on a vector value having a certain value or more. For another example, the feature vector may be extracted from time-series data for each sensor based on a rising pattern and/or falling pattern having a certain slope value or more.

In an embodiment, a graph (a) shows the characteristics of sensor data being distributed without separate classification before the sensor data is learned through the first learning model, and a graph (b) shows the characteristics of sensor data being classified and distributed after the sensor data is learned through the first learning model. For example, the graph (b) may represent characteristics in which data with a correlation degree between a plurality of sensors greater than or equal to a preset value are classified and distributed among sensor data.

In an embodiment, the analysis device 120 may extract a feature value from sensor data with the same and/or similar correlations from sensor data after that the sensor data is learned through the first learning model. For example, the analysis device 120 may extract a first feature value from sensor data distributed around (75, 0) to (75, 25) and extract a second feature value from sensor data distribute around (−75, 0) to (−50, 0) in the graph (b).

Figure 8:
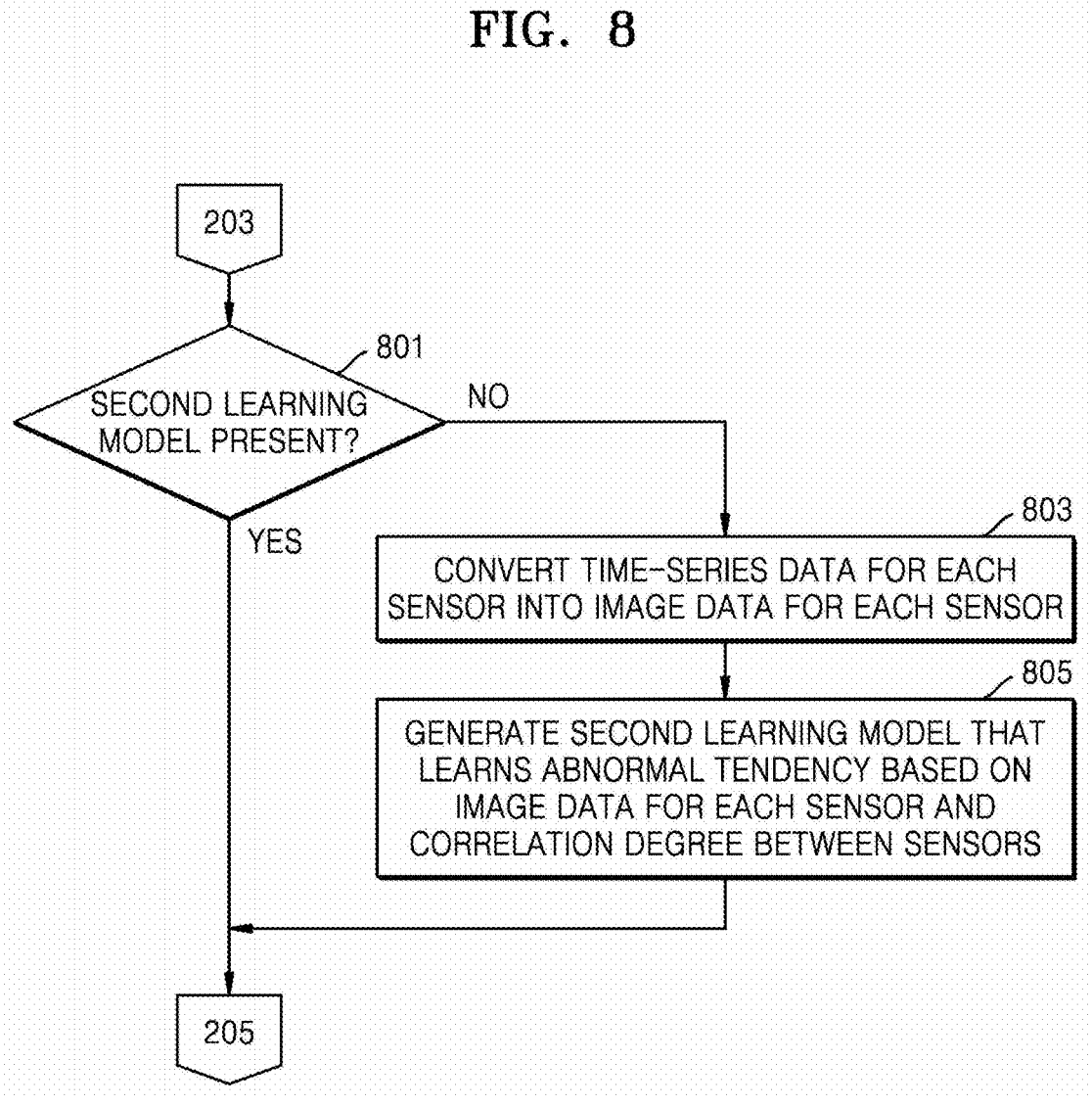
FIG. 8 is a flowchart showing a case in which a deep learning-based analysis system generates a second learning model, according to an embodiment.

FIG. 8 is a flowchart showing a case in which a deep learning-based analysis system generates a second learning model, according to an embodiment. FIG. 8 additionally shows operations subsequent to operation 203 of FIG. 2, and thus content that corresponds to, is the same as, or is similar to the content described above may be omitted.

Referring to FIG. 8, a processor (e.g., the processor 124 of FIG. 1) of an analysis device (e.g., the analysis device 120 of FIG. 1) of a deep learning-based analysis system (e.g., the deep learning-based analysis system 100 of FIG. 1) may determine whether there is the second learning model in operation 801. In this case, the "second learning model" may refer to a learning model that learns an abnormal tendency based on time-series data for each sensor extracted from multivariate time-series data and a correlation degree between a plurality of sensors.

According to an embodiment, when there is a previously generated second learning model, the processor 124 may proceed to operation 205.

According to an embodiment, when there is no previously generated second learning model, the processor 124 may convert time-series data for each sensor extracted from the multivariate time-series data into image data for each sensor in operation 803. In this case, an image data conversion algorithm may be any one of a Gramian angular field (GAF), a Markov transition field (MTF), a recurrence plot (RP), grey scale encoding (GSE), an affinity matrix (AM), and dynamic time warping (DTW).

For example, the processor 124 may extract first time-series data related to the first sensor and second time-series data related to the second sensor from multivariate time-series data (e.g., the multivariate time-series data 500 of FIG. 5) received from a detection device (e.g., the detection device 110 of FIG. 1). Then, the processor 124 may encode the extracted first time-series data and second time-series data and may then apply an image data conversion algorithm to convert the extracted data into image data corresponding to each time-series data.

In an embodiment, image data for each sensor converted through an image data conversion algorithm may have a preset data size. For example, even if the sizes of the time-series data of the first sensor and the second sensor are different due to equipment processes with different temporal characteristics, the preset data size is kept the same by converting the corresponding time-series data into image data. That is, the amount of computation may be reduced and processing may be established at an efficient cost by converting and processing time-series data into image data, and the possibility of data loss that may occur in a dimension reduction or interpolation method according to the related art may be eliminated.

According to an embodiment, the processor 124 may generate the second learning model that learns an abnormal tendency based on image data for each sensor and a correlation degree between a plurality of sensors in operation 805. In the disclosure, the "abnormal tendency" may mean a tendency in data detected by a sensor due to an operation error that occurs in an equipment process. For example, the abnormal tendency may appear in the form of a certain pattern on a graph or exceeding a threshold value on a numerical value, but is not limited thereto.

In an embodiment, the processor 124 may display each image data in vector form (i.e., in the form of an original vector) by performing preprocessing by encoding image data for each sensor. Then, the processor 124 may input each image data displayed in vector form to an auto-encoder and apply a correlation degree between sensors depending on a feature vector included in a latent space (e.g., the latent space 540 of FIG. 5) of a first learning model (e.g., the auto-encoder 520 of FIG. 5) to generate the second learning model that learns an abnormal tendency. This will be described below in detail with reference to FIG. 10.

Figure 9:
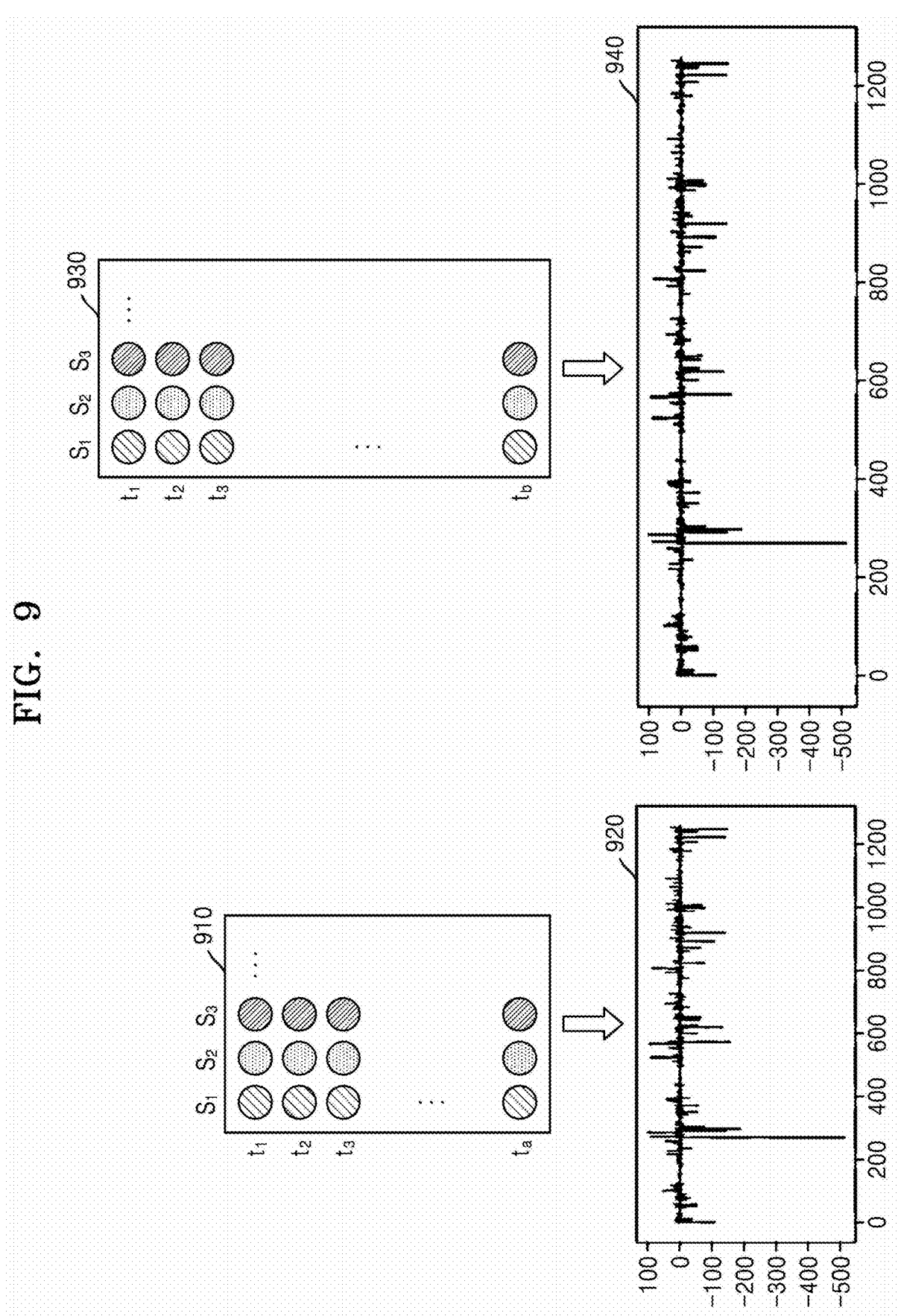
FIG. 9 is an example diagram showing time-series data with different temporal characteristics obtained by a deep learning-based analysis system, according to an embodiment.

FIG. 9 is an example diagram showing time-series data with different temporal characteristics obtained by a deep learning-based analysis system, according to an embodiment.

Referring to FIG. 9, when an analysis device (e.g., the analysis device 120 of FIG. 1) of a deep learning-based analysis system (e.g., the deep learning-based analysis system 100 of FIG. 1) receives time-series data for the substrate (a) and time-series data for the substrate (b) from a detection device (e.g., the detection device 110 of FIG. 1), the analysis device 120 may receive data in the form of first data 910 for the substrate (a) and second data 920 for the substrate (b). In this case, the analysis device 120 may derive that a time taken to generate the substrate (a) is $t_a$ and derive that a time taken to generate the substrate (b) is $t_b$. The analysis device 120 may derive that a time taken to generate the substrate (b) is longer than that of the substrate (a).

In an embodiment, the analysis device 120 may perform preprocessing by encoding the time-series data received from the detection device 110. For example, the analysis device 120 may perform data encoding on the first data 910 for the substrate (a) received from the detection device 110 to create first encoding data 920. The analysis device 120 may perform data encoding on second data 930 for the substrate (b) received from the detection device 110 to create second encoding data 940.

In this case, the first encoding data 920 and the second encoding data 940 may have different data sizes. When deep learning analysis is performed on data with different sizes, an excessive amount of computation may occur and the possibility that some data is lost during a data reduction process may not be obviated. Accordingly, an embodiment of converting the above encoded data into image data and performing deep learning analysis will be described below with reference to FIG. 10.

Figure 10:
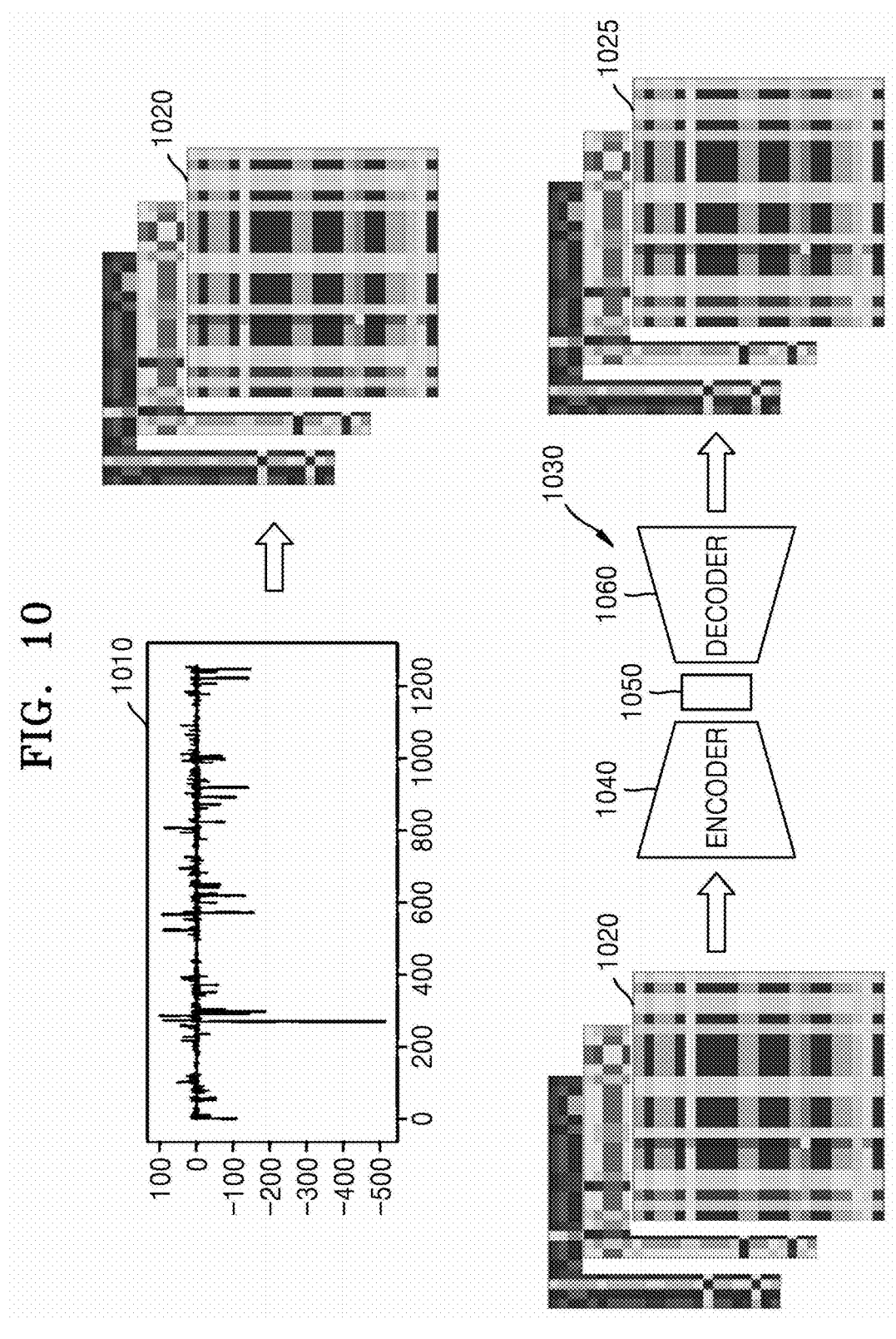
FIG. 10 is an example diagram for explaining a method of generating the second learning model of FIG. 8.

FIG. 10 is an example diagram for explaining a method of generating the second learning model of FIG. 8.

Referring to FIG. 10, an analysis device (e.g., the analysis device 120 of FIG. 1) of a deep learning-based analysis system (e.g., the deep learning-based analysis system 100 of FIG. 1) may convert encoding data obtained by performing preprocessing on time-series data for each sensor into image data. For example, the analysis device 120 may display the first time-series data as first encoding data 1010 in vector form as preprocessing is performed by encoding first time-series data for the first sensor. Then, the analysis device 120 may convert the first encoding data 1010 into first image data 1020 based on an image data conversion algorithm. In this case, the image data conversion algorithm may be any one of a Gramian angular field (GAF), a Markov transition field (MTF), a recurrence plot (RP), grey scale encoding (GSE), an affinity matrix (AM), and dynamic time warping (DTW).

Then, the analysis device 120 may display each data in vector form by performing preprocessing by encoding the converted image data. Then, the analysis device 120 may input each image data display in vector form to an auto-encoder 1030. In this case, the auto-encoder 1030 may refer to the "second learning model".

When a certain original vector is input to the auto-encoder 1030, an encoder 1040 may perform lossy compression on data of the original vector, and a decoder 1060 may perform decompression on lossy compressed intermediate data. The auto-encoder 1030 may automatically learn a method of extracting a feature vector from the original vector such that a restoration vector obtained by performing decompression through the decoder 550 becomes the same as the original vector.

For example, when the first original vector obtained by preprocessing the first image data 1020 created from time-series data for the first sensor is input to the auto-encoder 1030, the encoder 1040 may perform lossy compression on data of the first original vector and the decoder 1060 may perform decompression on lossy compressed intermediate data. In this case, the auto-encoder 1030 may extract the feature vector from the first original vector such that the first image data 1020 for the first sensor is the same as data 1025 output from the auto-encoder 1030.

In an embodiment, the analysis device 120 may add a feature vector included in a latent space (e.g., the latent space 540 of FIG. 5) of a first learning model (e.g., the auto-encoder 520 of FIG. 5) to a latent space (i.e., a latent space 1050) of a second learning model (i.e., the auto-encoder 1030). For example, the analysis device 120 may obtain a feature vector representing a correlation degree between sensors from the latent space 540 as the correlation degree is learned by the first learning model 520 and add the feature vector to the latent space 1050 of the second learning model 1030. Accordingly, the analysis device 120 may apply the feature characteristics of image data as the feature vector (i.e., a correlation degree between sensors) obtained by the first learning model 520 and the feature vector of the second learning model 1030 to obtain and learn an abnormal tendency.

In an embodiment, when time-series data for a certain sensor is input to the second learning model 1030, the analysis device 120 may compare data of sensors having a correlation degree between sensors greater than or equal to a preset value with respect to the certain sensor to obtain and learn an abnormal tendency. For example, when time-series data for the first sensor is input to the second learning model 1030, the analysis device 120 may compare the time-series data for the first sensor with time-series data for the second sensor that is a sensor having a correlation degree between sensors greater than or equal to a preset value (e.g., 0.7) with respect to the first sensor. In this case, before comparing the time-series data, the analysis device 120 may encode the corresponded data, may convert the data into image data, and may then encode the encoded image data.

Then, as a result of comparing image data of the sensors having a correlation degree between sensors greater than or equal to a preset value, the analysis device 120 may determine that the input data for the certain sensor has an abnormal tendency. In this case, the analysis device 120 may calculate reconstruction loss for image data for each sensor of a plurality of sensors, and calculate an error score for each sensor based on the calculated reconstruction loss.

The deep learning-based analysis system according to the technical spirit of the disclosure may improve the reliability of an error score for multivariate time-series data by obtaining and learning a correlation degree between a plurality of sensors from multivariate time-series data.

The deep learning-based analysis system according to the technical spirit of the disclosure may reduce the amount of computation by converting time series data with different temporal characteristics into images and learning and analyzing the images and eliminate the possibility of data loss that may occur in a dimension reduction or interpolation method according to the related art.

However, the effects of the embodiments are not limited to the effects described above, and effects that are not mentioned may be clearly understood by those skilled in the art from the specification and the attached drawings.

Thus far, the disclosure has been described with reference to the embodiments shown in the drawings, but these are merely illustrative, and it will be understood by those of ordinary skill in the art that various modifications and other equivalent embodiments may be made therefrom. Therefore, the true scope of technical protection of the disclosure needs to be determined by the technical spirit of the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:
1. A semiconductor manufacturing apparatus including a deep learning-based analysis system comprising:
  semiconductor equipment to perform a semiconductor process to generate a plurality of products; and the deep learning-based analysis system comprising:

a detection device including a plurality of sensors to collect data of the semiconductor process and provide corresponding multivariate time-series data; and an analysis device including at least one processor, the at least one processor being configured to receive the multivariate time-series data and to:

obtain a corresponding correlation degree between corresponding ones of the plurality of sensors based on a first learning model using the received multivariate time-series data as input;

calculate an error score for each sensor based on a second learning model using time-series data for each sensor extracted from the received multivariate time-series data as input;

determine that an error score of a first sensor of the plurality of sensors exceeds a threshold value; and in response to the determination of the error score of the first sensor exceeding the threshold value, output a control signal or process operation data corresponding to the first sensor through an interface for controlling the equipment process.

2. The semiconductor manufacturing apparatus of claim 1, wherein the at least one processor is further configured to generate the first learning model that learns the corresponding correlation degree between corresponding ones of the plurality of sensors based on the multivariate time-series data provided by the plurality of sensors.

3. The semiconductor manufacturing apparatus of claim 1, wherein the at least one processor is further configured to generate the first learning model that learns the corresponding correlation degree between corresponding ones of the plurality of sensors based on similarity-related feature characteristics for the multivariate time-series data provided by the plurality of sensors.

4. The semiconductor manufacturing apparatus of claim 1, wherein the at least one processor is further configured to:

convert the time-series data for each sensor provided by the plurality of sensors into converted image data for each sensor; and use the second learning model to detect an abnormality of the semiconductor process based on the converted image data for each sensor and the correlation degree between the plurality of sensors.

5. The semiconductor manufacturing apparatus of claim 4, wherein the converted image data for each sensor has a preset data size.

6. The semiconductor manufacturing apparatus of claim 4, wherein, for sensors having a corresponding correlation degree greater than or equal to a preset value, the at least one processor is further configured to generate the second learning model by comparing a plurality of corresponding converted image data.

7. The semiconductor manufacturing apparatus of claim 4, wherein the at least one processor is further configured to:

calculate reconstruction loss for the converted image data for each sensor of the plurality of sensors based on the second learning model; and calculate the error score for each sensor based on the calculated reconstruction loss.

8. A method of manufacturing a semiconductor product with semiconductor equipment having a plurality of sensors, the method comprising:

with the semiconductor equipment, performing a semiconductor process to generate a plurality of semiconductor products;

receiving multivariate time-series data provided by the plurality of sensors of the semiconductor equipment;

obtaining a corresponding correlation degree between corresponding ones of the plurality of sensors based on a first learning model that uses the received multivariate time-series data as input;

calculating an error score for each sensor based on a second learning model using time-series data for each sensor extracted from the received multivariate time-series data as input;

determining that an error score of a first sensor of the plurality of sensors exceeds a threshold value; and in response to the determination, outputting a control signal or process operation data for controlling the semiconductor process corresponding to the first sensor.

9. The method of claim 8, further comprising generating the first learning model that learns the corresponding correlation degree between corresponding ones of the plurality of sensors based on the multivariate time-series data provided by the plurality of sensors.

10. The method of claim 8, further comprising generating the first learning model that learns the corresponding correlation degree between corresponding ones of the plurality of sensors based on similarity-related feature characteristics for the multivariate time-series data provided by the plurality of sensors.

11. The method of claim 8, further comprising:

converting the time-series data for each sensor provided by the plurality of sensors into converted image data for each sensor; and using the second learning model to detect an abnormality of the semiconductor process based on the converted image data for each sensor and the correlation degree between the plurality of sensors.

12. The method of claim 11, wherein the converted image data for each sensor has a preset data size.

13. The method of claim 11, further comprising, for sensors having a corresponding correlation degree greater than or equal to a preset value, generating the second learning model by comparing a plurality of corresponding converted image data.

14. The method of claim 11, further comprising:

calculating reconstruction loss for the converted image data for each sensor of the plurality of sensors based on the second learning model; and calculating the error score for each sensor based on the calculated reconstruction loss.

15. A deep learning-based analysis device for detecting defects in a semiconductor product processed by semiconductor equipment, the deep learning-based analysis device comprising:

a communication unit configured to receive data through communication with the semiconductor equipment; and at least one processor, wherein the at least one processor is configured to:

receive multivariate time-series data provided by a plurality of sensors of the semiconductor equipment through the communication unit;

acquire a corresponding correlation degree between corresponding ones of the plurality of sensors based on a first learning model using the received multivariate time-series data as input;

calculate an error score for each sensor based on a second learning model using the correlation degree between the plurality of sensors as input;

determine that an error score of a first sensor of the plurality of sensors exceeds a threshold value; and based on the determination of the error score of the first sensor exceeding the threshold value, output a control signal or process operation data for controlling the semiconductor process corresponding to the first sensor through an interface.

16. The deep learning-based analysis device of claim 15, wherein the at least one processor is further configured to generate the first learning model that learns the corresponding correlation degree between corresponding ones of the plurality of sensors based on the multivariate time-series data provided by the plurality of sensors.

17. The deep learning-based analysis device of claim 15, wherein the at least one processor is further configured to:

convert the time-series data for each sensor provided by the plurality of sensors into converted image data for each sensor; and use the second learning model to detect an abnormality of a process of the semiconductor equipment based on the converted image data for each sensor and the correlation degree between the plurality of sensors.

18. The deep learning-based analysis device of claim 17, wherein the at least one processor is further configured to:

calculate reconstruction loss for the converted image data for each sensor of the plurality of sensors based on the second learning model; and calculate the error score for each sensor based on the calculated reconstruction loss.

* * * * *